United States Patent
Korhonen et al.

(10) Patent No.: US 12,225,489 B2
(45) Date of Patent: Feb. 11, 2025

(54) TIMING CONTROL IN A RADIO ACCESS NETWORK NODE

(71) Applicant: Nokia Technologies Oy, Espoo (FI)

(72) Inventors: Juha Sakari Korhonen, Espoo (FI); Keeth Saliya Jayasinghe Laddu, Espoo (FI); Ilkka Antero Keskitalo, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 379 days.

(21) Appl. No.: 17/799,150

(22) PCT Filed: Feb. 14, 2020

(86) PCT No.: PCT/EP2020/053941
§ 371 (c)(1),
(2) Date: Aug. 11, 2022

(87) PCT Pub. No.: WO2021/160288
PCT Pub. Date: Aug. 19, 2021

(65) Prior Publication Data
US 2023/0083061 A1    Mar. 16, 2023

(51) Int. Cl.
*H04W 56/00*   (2009.01)

(52) U.S. Cl.
CPC ..... *H04W 56/005* (2013.01); *H04W 56/0015* (2013.01); *H04W 56/002* (2013.01)

(58) Field of Classification Search
CPC ........... H04W 56/005; H04W 56/0015; H04W 56/002
USPC .......................................................... 455/517
See application file for complete search history.

(56) References Cited

U.S. PATENT DOCUMENTS

| | | | |
|---|---|---|---|
| 2020/0053625 A1* | 2/2020 | Abedini | H04L 45/122 |
| 2020/0053626 A1* | 2/2020 | Abedini | H04W 72/23 |
| 2020/0053680 A1* | 2/2020 | Abedini | H04W 56/0025 |

FOREIGN PATENT DOCUMENTS

WO    WO 2019/246248 A1    12/2019

OTHER PUBLICATIONS

Huawei et al., "Futher consideration on timing alignment for IAB nodes", 3GPP TSG RAN WG1 Meeting #94bis, R1-1810133, Chengdu, China, Oct. 8-12, 2018.
CMCC, "Discussions on enhancements to support NR Backhaul link", 3GPP TSG RAN WG1 Meeting #94bis, R1-1811035, Chengdu, China, Oct. 8-12, 2018.
ZTE et al., "Discussion on physical layer enhancements for NR IAB," 3GPP TSG RAN WG1 Meeting #94bis, R1-1811160, Chengdu, China, Oct. 8-12, 2018.

* cited by examiner

*Primary Examiner* — April G Gonzales
(74) *Attorney, Agent, or Firm* — Robert P. Michal, Esq.; Carter, DeLuca & Farrell LLP

(57) ABSTRACT

According to an aspect, there is disclosed a method that includes aligning, by a radio access network node wirelessly connected to at least two parent nodes and to a child node, an uplink reception timing associated with the child node with a downlink reception timing associated with a parent node of the at least two parent nodes.

16 Claims, 4 Drawing Sheets

ALIGNING, BY A RADIO ACCESS NETWORK NODE WIRELESSLY CONNECTED TO AT LEAST TWO PARENT NODES AND TO A CHILD NODE, AN UPLINK RECEPTION TIMING ASSOCIATED WITH THE CHILD NODE WITH A DOWNLINK RECEPTION TIMING ASSOCIATED WITH THE AT LEAST TWO PARENT NODES — 200

TIMING CONTROL IN A RADIO ACCESS NETWORK NODE

CROSS REFERENCE TO RELATED APPLICATION

This patent application is a U.S. National Stage application of International Patent Application Number PCT/EP2020/053941 filed Feb. 14, 2020, which is hereby incorporated by reference in its entirety.

TECHNICAL FIELD

The present application generally relates to the field of wireless communications. In particular, the present application relates to a radio access network node for wireless communication, and a related method and a computer program.

BACKGROUND

Nodes in a telecommunication network can be connected to each other via a wireless or a wired link. A radio access network node may provide wireless connectivity to a child node that may be a user terminal or another radio access network node. On the other side, the radio access network node may be simultaneously connected to two parent nodes. Thus, the radio access network node acts as an intermediate node between the parent nodes and the child node.

When the radio access network node is connected to multiple parent nodes, signal propagation times from the parent nodes to the radio access network node may not be equal. Thus, the radio access network node experiences different timings at its receiver from the parent nodes. On the other hand, the radio access network node experiences at its receiver a single timing from the child node.

SUMMARY

According to an example embodiment, there is provided a method comprising aligning, by a radio access network node wirelessly connected to at least two parent nodes and to a child node, an uplink reception timing associated with the child node with a downlink reception timing associated with a parent node of the at least two parent nodes.

In an example embodiment, the method further comprises determining, by the radio access network node, downlink reception timings associated with the at least two parent nodes; and configuring, by the radio access network node, the child node to transmit with a downlink reception timing associated with a parent node of the at least two parent nodes.

In an example embodiment, the method further comprises signaling, by the radio access network node, to the child node one or more timing offsets relative to a transmission timing associated with the child node; and scheduling, by the radio access network node, the child node to transmit with a time offset of the one or more timing offsets.

In an example embodiment, the signaling comprises signaling the one or more timing offsets in a medium access control (MAC) control element.

In an example embodiment, the scheduling comprises signaling an indication to the child node which timing offset of the one or more timing offset to use.

In an example embodiment, the method further comprises updating, by the radio access network node, at least one time offset of the one or more timing offsets to the child node.

In an example embodiment, the method further comprises updating, by the radio access network node, the one or more timing offsets to the child node relative to the present values of the one or more timing offsets.

In an example embodiment, the method further comprises maintaining, by the radio access network node, a single downlink reception timing associated with the at least two parent nodes.

In an example embodiment, the method further comprises indicating, by the radio access network node, to each parent node of the at least two parent nodes whether the parent node is a reference parent node or a secondary parent node; and indicating, by the radio access network node, the secondary parent node about timing transitions compared to the reference parent node and about a downlink reception timing difference to enable the secondary parent node to derive timing gaps at the radio access network node to guarantee the single downlink reception timing at the radio access network node.

In an example embodiment, the radio access network node comprises an integrated access and backhaul node.

According to an example embodiment, there is provided a radio access network node wirelessly connected to at least two parent nodes and to a child node. The radio access network node comprises at least one processor and at least one memory including computer program code. The at least one memory and the computer program code configured to, with the at least one processor, cause the radio access network node to at least perform: aligning an uplink reception timing associated with the child node with a downlink reception timing associated with a parent node of the at least two parent nodes.

In an example embodiment, the at least one memory and the computer program code are configured to, with the at least one processor, cause the radio access network node to at least perform:

determining, by the radio access network node, downlink reception timings associated with the at least two parent nodes; and configuring, by the radio access network node, the child node to transmit with a downlink reception timing associated with a parent node of the at least two parent nodes.

In an example embodiment, the at least one memory and the computer program code are configured to, with the at least one processor, cause the radio access network node to at least perform: signaling, by the radio access network node, to the child node one or more timing offsets relative to a transmission timing associated with the child node; and scheduling, by the radio access network node, the child node to transmit with a time offset of the one or more timing offsets.

In an example embodiment, the signaling comprises signaling the one or more timing offsets in a medium access control (MAC) control element.

In an example embodiment, the scheduling comprising signaling an indication to the child node which timing offset of the one or more timing offset to use.

In an example embodiment, the at least one memory and the computer program code are configured to, with the at least one processor, cause the radio access network node to at least perform: updating, by the radio access network node, at least one time offset of the one or more timing offsets to the child node.

In an example embodiment, the at least one memory and the computer program code are configured to, with the at least one processor, cause the radio access network node to at least perform: updating, by the radio access network node, the one or more timing offsets to the child node relative to the present values of the one or more timing offsets.

In an example embodiment, the at least one memory and the computer program code are configured to, with the at least one processor, cause the radio access network node to at least perform: maintaining, by the radio access network node, a single downlink reception timing associated with the at least two parent nodes.

In an example embodiment, the at least one memory and the computer program code are configured to, with the at least one processor, cause the radio access network node to at least perform: indicating, by the radio access network node, to each parent node of the at least two parent nodes whether the parent node is a reference parent node or a secondary parent node; and indicating, by the radio access network node, the secondary parent node about timing transitions compared to the reference parent node and about a downlink reception timing difference to enable the secondary parent node to derive timing gaps at the radio access network node to guarantee the single downlink reception timing at the radio access network node.

In an example embodiment, the radio access network node comprises an integrated access and backhaul node.

According to an example embodiment, there is provided a radio access network node wirelessly connected to at least two parent nodes and to a child node. The radio access network node comprises means for aligning an uplink reception timing associated with the child node with a downlink reception timing associated with a parent node of the at least two parent nodes.

According to an example embodiment, there is provided a computer program comprising instructions for causing an apparatus to perform the method of any of the above example embodiments.

According to an example embodiment, there is provided a computer readable medium comprising program instructions for causing an apparatus to perform the method of any of the above example embodiments.

DESCRIPTION OF THE DRAWINGS

The accompanying drawings, which are included to provide a further understanding of the embodiments and constitute a part of this specification, illustrate embodiments and together with the description help to explain the principles of the embodiments. In the drawings.

Like reference numerals are used to designate like parts in the accompanying drawings.

DETAILED DESCRIPTION

Reference will now be made in detail to embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1A:
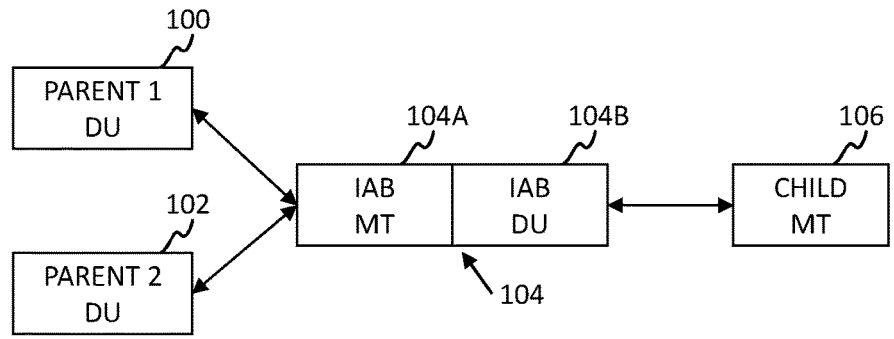
FIG. 1A illustrates an example embodiment of a system.

FIG. 1A illustrates an example embodiment of a system. The system comprises two parent nodes 100, 102, a radio access network node 104 and a child node 106. The example embodiment illustrated in FIG. 1A uses an integrated and backhaul (IAB) node to illustrate a solution for timing control. The parent node 100, 102 may be, for example, another IAB node or a donor node. The child node 106 may be another IAB node or an access user equipment (UE). The integrated access and backhaul concept is discussed further, for example, in 3GPP TR 38.874 0.7.0 (2018-11). An IAB node is a radio access network (RAN) node that supports wireless access to UEs and wirelessly backhauls the access traffic. Further, in the IAB architecture, each IAB node holds a distributed unit (DU) and a mobile termination (MT) function. Usually the mobile termination function is defined as a component of the Mobile Equipment. In connection with the IAB architecture, the MT may be referred to as a function residing on an IAB node that terminates the radio interface layers of the backhaul Uu interface toward the IAB donor or other IAB nodes. Via the MT 104A, the IAB node 104 connects to an upstream IAB node or the IAB donor. Via the DU 104B, the IAB node 104 establishes RLC-channels to UEs and to MTs of downstream IAB nodes. The example of FIG. 1A illustrates that the DU 104B connects to the child node 106.

Further, half-duplex constraint may be assumed for the IAB node 104. This means that the IAB node may not be capable of transmitting and receiving simultaneously. When applying frequency division multiplexing (FDM)/space division multiplexing (SDM) operation of the IAB MT 104A and IAB DU 104B, the IAB MT 140A and IAB DU 104B may transmit simultaneously or receive simultaneously (TX or RX side FDM/SDM). The discussion herein concentrates to the simultaneous receiving operation (RX side FDM/SDM).

Figure 1B:
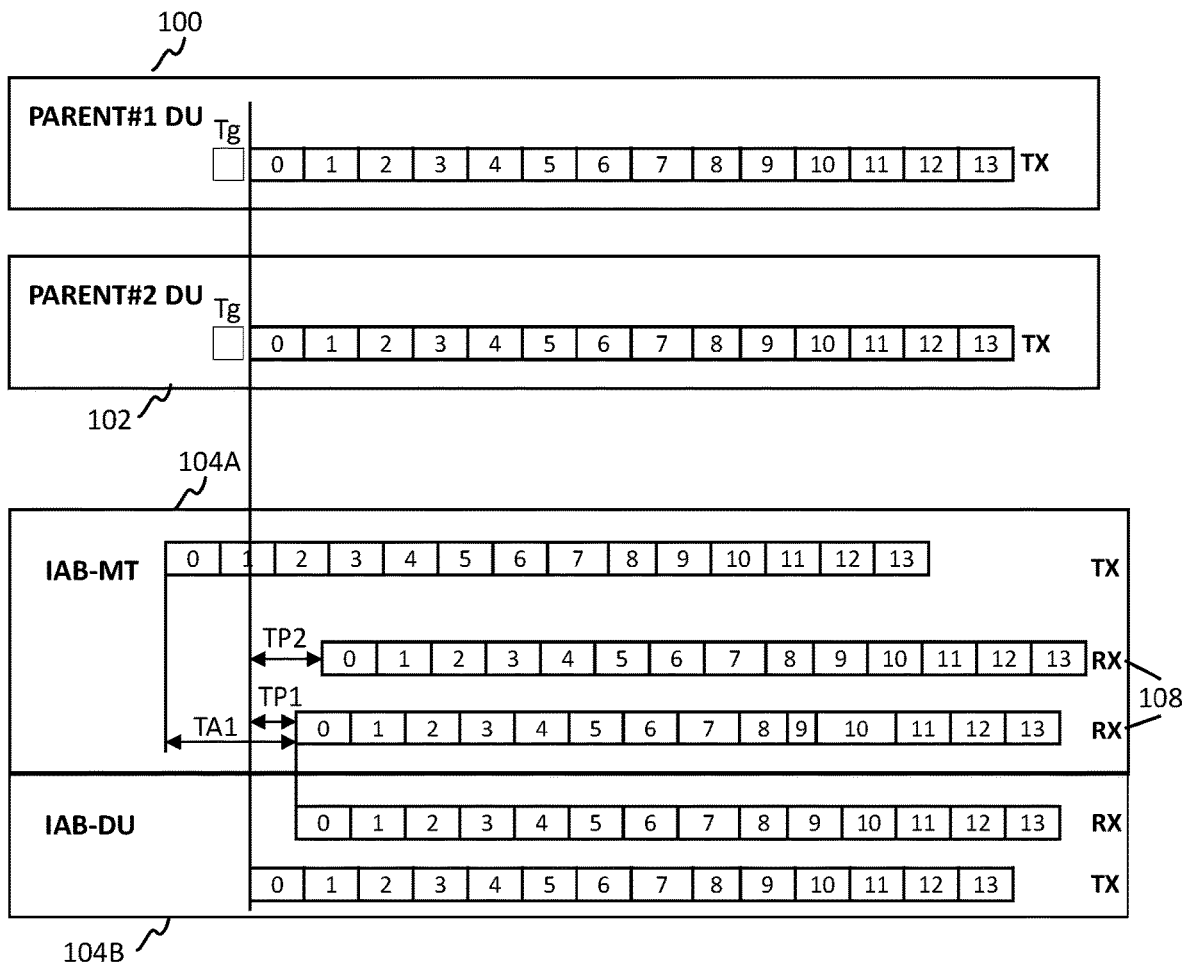
FIG. 1B illustrates another example embodiment of the system illustrated in FIG. 1A.

FIG. 1B illustrates another example embodiment of the system illustrated in FIG. 1A. FIG. 1B illustrates relative RX/TX slot timings at the IAB node 104 and its parent nodes 100, 102 when the IAB node 104 has dual connectivity (DC) to two parent nodes 100, 102. The DL signals are assumed to be synchronized. The two backhaul links to the parent nodes 100, 102 can have different propagation delays (TP), as illustrated by TP1 and TP2 in FIG. 1B. This causes time difference between the two RX signals 108 of the DC connections.

Figures 2, 3:
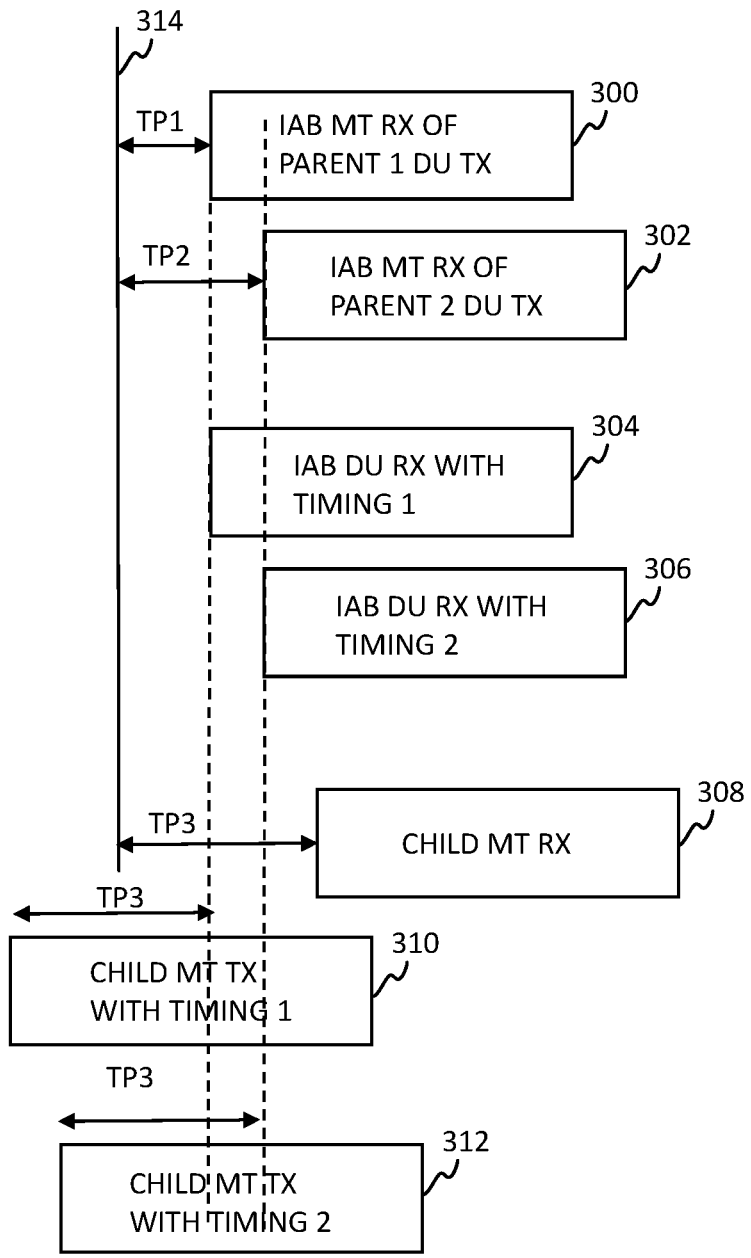
FIG. 2 illustrates an example embodiment for timing control at a radio access network node.
FIG. 3 illustrates an example embodiment for aligning an uplink reception timing associated with the child node with a downlink reception timing associated with parent node of the at least two parent nodes.

FIG. 2 illustrates an example embodiment for timing control at a radio access network node.

At 200, an uplink reception timing associated with the child node with a downlink reception timing associated with a parent node of the at least two parent nodes is aligned by a radio access network node wirelessly connected to at least two parent nodes and to a child node. In an example embodiment, the radio access network node comprises an integrated access and backhaul (IAB) node.

In an example embodiment of FIG. 2, the IAB node 104 may be configured to maintain a single downlink reception timing associated with the at least two parent nodes. The IAB node 104 may be configured to indicate to each parent node of the at least two parent nodes 100, 102 whether the parent node is a reference parent node or a secondary parent node. The IAB node 104 may also be configured to indicate the secondary node about timing transitions compared to the reference parent.

The secondary parent node may use the information in the following Table 1 to interpret the timing transitions to the reference parent node:

TABLE 1

| MT to DU | DL Tx | UL Rx |
|---|---|---|
| DL Rx (reference parent node) | 0-4 symbols | 0 |
| UL Tx (reference parent node) | 0-4 symbols | 0-4 symbols |
| DU to MT | DL Rx (reference parent node) | UL Tx (reference parent node) |
| DL Tx | 0-4 symbols | 0-4 symbols |
| UL Rx | 0 | 0-4 symbols |

The IAB node 104 may also be configured to indicate to the secondary node about a downlink reception timing difference to enable the secondary parent to derive timing gaps at the radio access network node to guarantee the single downlink reception timing at the radio access network node. The following Table 2 illustrates an example of a downlink reception timing difference:

TABLE 2

| MT RX difference | MT Rx (secondary parent node) |
|---|---|
| ML Rx (reference parent node) | −X to X |

The MT RX difference in Table 2 is given with a granularity that allows RX timing alignment within cyclic prefix.

FIG. 3 illustrates an example embodiment for aligning an uplink reception timing associated with the child node with a downlink reception timing associated with a parent node of the at least two parent nodes.

A block 300 illustrates signals received by the IAB MT 104A from the parent node 100 and having a propagation delay TP1 when the parent node 100 has transmitted its signals at 314. A block 302 illustrates signals received by the IAB MT 104A from the parent node 102 and having a propagation delay TP2 when the parent node 102 has transmitted its signals at 314. A block 304 illustrates a situation when the IAB DU 104B should receive signals from the child node 106 so that this timing would align with the timing of signals received from the parent node 100. A block 306 illustrates a situation when the IAB DU 104B should receive signals from the child node 106 so that this timing would align with the timing of signals received from the parent node 102.

A block 308 illustrates signals received by the child MT 106 from the IAB DU 104B and having a propagation delay TP3 when the IAB DU 104B has transmitted its signals at 314. Thus, in order to align the timing associated with the child node 106 with respect to the timing associated with the parent node 100, the child node 106 should perform its transmission by taking into account the transmission delay TP3 and start its transmissions illustrated by a block 310 so that the timing aligns with the start of the block 304.

Similarly, in order to align the timing associated with the child node 106 with respect to the timing associated with the parent node 102, the child node 106 should perform its transmission by taking into account the transmission delay TP3 and start its transmissions illustrated by a block 312 so that the timing aligns with the start of the block 306. The IAB node 104 may be configured schedule the child node 106 to transmit with the timing configured either for the parent node 100 or the parent node 102.

Figure 4:
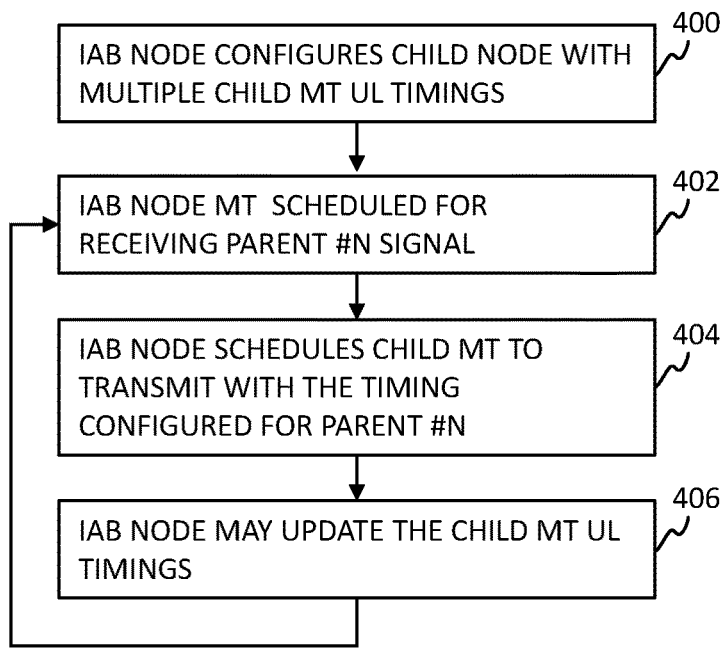
FIG. 4 illustrates an example embodiment for controlling transmission timing of a child node.

FIG. 4 illustrates an example embodiment for controlling transmission timing of a child node. The IAB node 104 may be configured to determine downlink reception timings associated with at least two parent nodes. This is illustrated, for example, by the block 300 and 302 in FIG. 3 where propagation delays TP1 and TP2 are associated with the parent node 100, 102. When the downlink reception timings are known, the IAB node 104 may configure the child node 106 to transmit with a downlink reception timing associated with a parent node of the at least two parent nodes.

To enable the child node to transmit with a correct downlink reception timing associated with a specific parent node, the IAB node 104 may be configured to configure the child node 106 with multiple child node MT uplink timings. In other words, the IAB node 104 may configure the child node 106 with a separate child node MT uplink timing based on each propagation delay associated with the parent nodes 100, 102.

At 402 the IAB node may be scheduled for receiving downlink signals associated with a specific parent node of the at least two parent nodes 100, 102. Then, at 404 the IAB node 104 may schedule the child node 106 to transmit with a downlink reception timing associated with this specific parent node of the at least two parent nodes 100, 102.

In an example embodiment, the IAB node 104 may be configured to indicate or signal to the child node 106 one or more timing offsets relative to an uplink transmission timing associated with the child node. The number of timings offsets may be equal with the number of parent nodes 100, 102 so that there is one timing offset associated with each parent node. When the IAB node 104 then schedules the child node 106 to transmit, a correct timing offset to be used may be indicated to the child node 106. The indication may be carried, for example, in downlink control information (DCI) and may be represented, for example, by one or two bits.

In an example embodiment, the uplink transmission timing may be obtained in a random access procedure, for example, from TA control while the IAB node 104 has been operating in time division multiplexing (TDM) mode, and therefore would correspond to timing suitable for TDM reception in the IAB node. In another example embodiment, the uplink transmission timing may correspond to aligning the IAB node's 104 DU RX with one of the MT RX timings. In this case, the number of timing offsets signalled for the child node 106 may be one less than the number of parent nodes.

In an example embodiment, a new medium access control (MAC) control element may be specified for configuring the timing offsets. However, the MAC control element is only one possible signalling option and other signalling implementations may be used.

Further, in an example embodiment, a procedure between the IAB node 104 and the parent nodes 100, 102 may be established where the IAB node 106 may indicate guard periods relating to switching from one MT RX timing to another. When the timing is dynamically changed depending on the active parent node link, at the switching point of the timing, the required number guard symbols between the RX/TX signals of the MT-DU transitions can be different from those indicated per parent backhaul link to one of the parent nodes. To cope with this, the IAB node 104 may indicate multiple sets of guard periods to the parent nodes to be taken into account in the scheduling at the times when the IAB timing is changed.

In an example embodiment, the IAB node 104 may update at least one time offset of the one or more timing offsets to the child node. The updating may be performed at any time after the initial configuration. The same MAC control element may be used as with the initial configuration. In another example embodiment, the one or more timing offsets to the child node may be updated relative to the present values of the one or more timing offsets. A new MAC control element may be used for signalling the updates.

Figure 5:
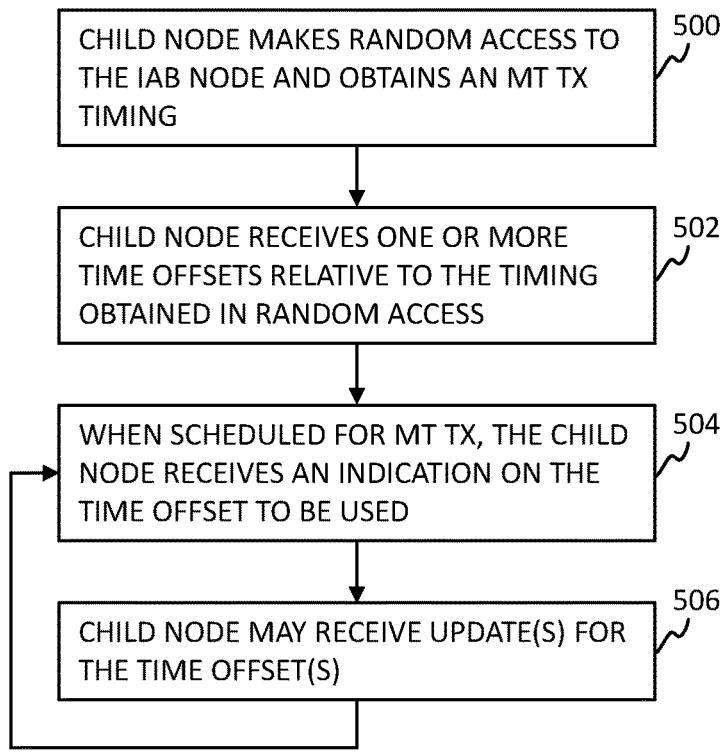
FIG. 5 illustrates an example embodiment for applying a timing offset at a child node.

FIG. 5 illustrates an example embodiment for applying a timing offset at a child node 106.

At 500, the child node 106 may be configured to perform a random access procedure to the IAB node 104 to obtain an uplink transmission timing (child MT UL timing).

At 502 the child node may be configured to receive one or more timing offsets relative to the uplink transmission timing obtained in the random access procedure. The number of timings offsets may be equal with the number of parent nodes 100, 102 so that there is one timing offset associated with each parent node.

At 504, when the child node 106 is scheduled for an uplink transmission, the child node 106 may be configured to receive from the IAB node 104 a correct timing offset to be used by the child node 106. Then, when performing the uplink transmission, the child node 106 is configured to use the timing offset indicated by the IAB node 104.

In an example embodiment, the child node 106 may receive an update from the IAB node 104 to at least one time offset of the one or more timing offsets. The updating may be performed at any time after the initial configuration. The same MAC control element may be used as with the initial configuration. In another example embodiment, the one or more timing offsets to the child node may be updated relative to the present values of the one or more timing offsets. A new MAC control element may be used for signalling the updates.

At least some of the illustrated example embodiments may allow scheduling child node transmissions for FDM/SDM with signals of any parent node.

Figure 6:
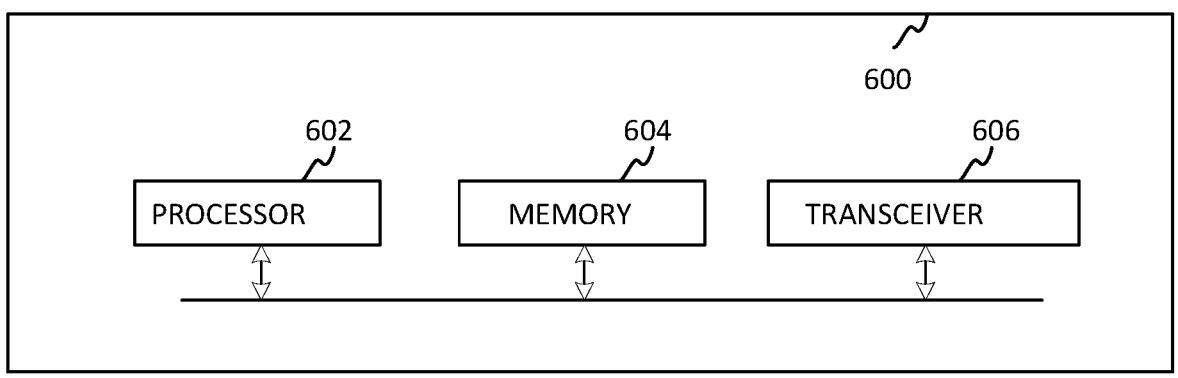
FIG. 6 illustrates an example embodiment of an apparatus.

FIG. 6 illustrates an example embodiment of an apparatus 600.

The apparatus 600 comprises one or more processors 602, and one or more memories 604 that comprise computer program code. The apparatus 600 may also comprise one or more transceivers 106, as well as other elements not illustrated in FIG. 6.

Although the apparatus 600 is depicted to include only one processor 602, the apparatus 600 may include more than one processor. In an example embodiment, the memory 604 is capable of storing instructions, such as an operating system and/or various applications.

Furthermore, the processor 602 is capable of executing the stored instructions. In an embodiment, the processor 602 may be embodied as a multi-core processor, a single core processor, or a combination of one or more multi-core processors and one or more single core processors. For example, the processor 602 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 602 may be configured to execute hard-coded functionality. In an example embodiment, the processor 602 is embodied as an executor of software instructions, wherein the instructions may specifically configure the processor 602 to perform the algorithms and/or operations described herein when the instructions are executed.

The memory 604 may be embodied as one or more volatile memory devices, one or more non-volatile memory devices, and/or a combination of one or more volatile memory devices and non-volatile memory devices. For example, the memory 604 may be embodied as semiconductor memories (such as mask ROM, PROM (programmable ROM), EPROM (erasable PROM), flash ROM, RAM (random access memory), etc.).

The apparatus 600 may be, for example, a radio access network node providing wireless communication, for example, the fifth generation New Radio (NG) wireless communication and arranged between a child node and two or more parent nodes. In an example embodiment, the apparatus 600 is an integrated access and backhaul (IAB) node. It is evident that the fifth generation New Radio (NG) wireless communication is only an example in which the disclosed solution can be used, and that the solution may be used with any wireless communication solution where a radio access network node has multiple parent nodes.

The at least one memory 604 and the computer program code are configured to, with the at least one processor 602, cause the apparatus 600 to at least perform: aligning an uplink reception timing associated with the child node with a downlink reception timing associated with a parent node of the at least two parent nodes.

Further, in an example embodiment, one or more elements of the apparatus 600 may constitute means for aligning an uplink reception timing associated with the child node with a downlink reception timing associated with the at least two parent nodes.

A computer program comprising instructions for causing an apparatus to perform, may perform the illustrated example embodiments.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method comprising:
   aligning, with a radio access network node wirelessly connected to at least two parent nodes and to a child node, an uplink reception timing associated with the child node with a downlink reception timing associated with a parent node of the at least two parent nodes;
   maintaining, with the radio access network node, a single downlink reception timing associated with the at least two parent nodes;
   indicating, with the radio access network node, to each parent node of the at least two parent nodes whether the parent node is a reference parent node or a secondary parent node; and
   indicating, with the radio access network node, the secondary parent node about timing transitions compared to the reference parent node and about a downlink reception timing difference to enable the secondary parent node to derive timing gaps at the radio access network node to guarantee the single downlink reception timing at the radio access network node.

2. The method according to claim 1, further comprising:
   determining, with the radio access network node, downlink reception timings associated with the at least two parent nodes; and
   configuring, with the radio access network node, the child node to transmit with a downlink reception timing associated with a parent node of the at least two parent nodes.

3. The method according to claim 2, further comprising:
   signaling, with the radio access network node, to the child node one or more timing offsets relative to a transmission timing associated with the child node; and
   scheduling, with the radio access network node, the child node to transmit with a time offset of the one or more timing offsets.

4. The method according to claim 3, wherein the signaling comprises signaling the one or more timing offsets in a medium access control (MAC) control element.

5. The method according to claim 3, wherein the scheduling comprises signaling an indication to the child node which timing offset of the one or more timing offset to use.

6. The method according to claim 3, further comprising:
   updating, with the radio access network node, at least one time offset of the one or more timing offsets to the child node.

7. The method according to claim 3, further comprising:
   updating, with the radio access network node, the one or more timing offsets to the child node relative to the present values of the one or more timing offsets.

8. The method according to claim 1, wherein the radio access network node comprises an integrated access and backhaul node.

9. A radio access network node wirelessly connected to at least two parent nodes and to a child node, the radio access network node comprising:
   at least one processor; and
   at least one non-transitory memory including computer program code;
   the at least one memory and the computer program code being configured to, with the at least one processor, cause the radio access network node to at least perform:
      aligning an uplink reception timing associated with the child node with a downlink reception timing associated a parent node of with the at least two parent nodes;
   wherein the at least one memory and the computer program code are configured to, with the at least one processor, cause the radio access network node to at least perform:
      maintaining a single downlink reception timing associated with the at least two parent nodes;
   wherein the at least one memory and the computer program code are configured to, with the at least one processor, cause the radio access network node to at least perform:
      indicating to each parent node of the at least two parent nodes whether the parent node is a reference parent node or a secondary parent node; and
      indicating the secondary parent node about timing transitions compared to the reference parent node and about a downlink reception timing difference to enable the secondary parent node to derive timing gaps at the radio access network node to guarantee the single downlink reception timing at the radio access network node.

10. The radio access network node according to claim 9, wherein the at least one memory and the computer program code are configured to, with the at least one processor, cause the radio access network node to at least perform:
    determining downlink reception timings associated with the at least two parent nodes; and
    configuring the child node to transmit with a downlink reception timing associated with a parent node of the at least two parent nodes.

11. The radio access network node according to claim 10, wherein the at least one memory and the computer program code are configured to, with the at least one processor, cause the radio access network node to at least perform:
    signaling to the child node one or more timing offsets relative to a transmission timing associated with the child node; and
    scheduling the child node to transmit with a time offset of the one or more timing offsets.

12. The radio access network node according to claim 11, wherein the signaling comprises signaling the one or more timing offsets in a medium access control (MAC) control element.

13. The radio access network node according to claim 11, wherein the scheduling comprising signaling an indication to the child node which timing offset of the one or more timing offset to use.

14. The radio access network node according to claim 11, wherein the at least one memory and the computer program code are configured to, with the at least one processor, cause the radio access network node to at least perform:

updating at least one time offset of the one or more timing offsets to the child node.

15. The radio access network node according to claim 11, wherein the at least one memory and the computer program code are configured to, with the at least one processor, cause the radio access network node to at least perform:

updating the one or more timing offsets to the child node relative to the present values of the one or more timing offsets.

16. The radio access network node according to claim 9, wherein the radio access network node comprises an integrated access and backhaul node.

* * * * *